United States Patent

Denby et al.

(10) Patent No.: US 8,953,496 B2
(45) Date of Patent: Feb. 10, 2015

(54) DETECTION OF ASYMMETRIC NETWORK ROUTES

(75) Inventors: Lorraine Denby, Berkeley Heights, NJ (US); Jean Meloche, Madison, NJ (US); John R. Tuck, Jr., Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 721 days.

(21) Appl. No.: 11/678,940

(22) Filed: Feb. 26, 2007

(65) Prior Publication Data

US 2008/0205292 A1    Aug. 28, 2008

(51) Int. Cl.
   H04L 12/42    (2006.01)
   H04L 12/721   (2013.01)
   H04L 12/26    (2006.01)
   H04L 12/701   (2013.01)
   H04L 12/28    (2006.01)

(52) U.S. Cl.
   CPC ............ H04L 45/26 (2013.01); H04L 43/0829 (2013.01); H04L 43/0864 (2013.01); H04L 43/10 (2013.01); H04L 45/00 (2013.01)
   USPC .......................................... 370/255; 370/252

(58) Field of Classification Search
   USPC ....................................................... 370/254
   See application file for complete search history.

(56) References Cited

U.S. PATENT DOCUMENTS

| | | | |
|---|---|---|---|
| 5,675,741 A | 10/1997 | Aggarwal et al. | |
| 6,104,695 A | 8/2000 | Wesley et al. | |
| 6,795,858 B1 * | 9/2004 | Jain et al. | 709/226 |
| 6,952,421 B1 * | 10/2005 | Slater | 370/401 |
| 7,031,264 B2 | 4/2006 | Adhikari et al. | |
| 2003/0086425 A1 | 5/2003 | Bearden et al. | |
| 2003/0091165 A1 | 5/2003 | Bearden et al. | |
| 2003/0097438 A1 | 5/2003 | Bearden et al. | |
| 2004/0062204 A1 | 4/2004 | Bearden et al. | |
| 2004/0252694 A1 | 12/2004 | Adhikari et al. | |
| 2005/0053009 A1 | 3/2005 | Denby et al. | |
| 2005/0207410 A1 | 9/2005 | Adhikari et al. | |

OTHER PUBLICATIONS

Postel, J. "Request for Comments 792: Internet Control Message Protocol" Network Working Group, (Sep. 1981), pp. 3-4.*
Crovella, M. et al "Internet Measurement: Infrastructure, Traffic, and Applications" John Wiley & Sons, Ltd, (2006), pp. 118-119.*
N. Thepvilojanapong et al., "Detection of Multiple Bottleneck Bandwidth," Proceedings of the 17th International Conference on Advanced Information Networking and Application (AINA '03), 8 pages, 2003.

(Continued)

*Primary Examiner* — Hanh N Nguyen
*Assistant Examiner* — Joshua A Kading

(57) ABSTRACT

Route asymmetry is detected in a network by running a route tracing program to trace routes between a first element of the network and a second element of the network. The route tracing program need be run at only a single network element, such as the first network element. Forward and reverse routes between the first and second network elements are identified as asymmetric if performance data from the route tracing program indicates a significant deviation from an expected monotonic characteristic as a function of time-to-live values of respective packets transmitted by the route tracing program.

21 Claims, 2 Drawing Sheets

(56) References Cited

OTHER PUBLICATIONS

U.S. Appl. No. 11/536,229, filed Sep. 28, 2006, A. Adhikari et al., "Root Cause Analysis of Network Performance Based on Exculpation or Inculpation Sets."

U.S. Appl. No. 11/531,910, filed Sep. 14, 2006, L. Denby et al., "Data Compression in a Distributed Monitoring System."

U.S. Appl. No. 11/496,360, filed Jul. 31, 2006, B. Karacali-Akyamac et al., "Determination of Endpoint Device Location for Efficient Analysis on Network Performance."

Y. Lin et al., "Measuring Asymmetric Link Bandwidths in Internet Using a Multi-Packet Delay Model," IEEE International Conference on Communications, pp. 1601-1605, 2003.

W. Jiang et al., "Detecting and Measuring Asymmetric Links in an IP Network," Global Telecommunications Conference, 5 pages, 1999.

Y. He et al, "How Asymmetric is Internet Routing? A Systematic Approach," ACM SIGCOMM '05, Philadelphia, 2005.

SGI TPL View (traceroute), http://techpubs.sgi.com/library/tpl/, pp. 1-5.

\* cited by examiner

DETECTION OF ASYMMETRIC NETWORK ROUTES

FIELD OF THE INVENTION

The invention relates generally to communication networks, and more particularly to techniques for detecting asymmetric routes in a network.

BACKGROUND OF THE INVENTION

It is generally desirable for routes in a network to be symmetric. Routes are also commonly referred to as paths, and a given route will typically comprise multiple links. Routes between two points A and B in a network may be considered symmetric if, for example, the sequence of routers traversed by a forward flow from point A to point B is the same as the reversed sequence of routers traversed by the reverse flow from point B to point A. Networks are designed with symmetric routes for simplicity and in order to facilitate troubleshooting. Also, use of asymmetric routing can lead to connectivity issues and other performance problems. For example, a filter or firewall may block a forward or reverse flow in the absence of an appropriate corresponding flow in the opposite direction.

A network engineer attempting to troubleshoot a given end-to-end network performance problem will typically first attempt to determine if the corresponding forward and reverse routes are symmetric, or will alternatively work under an assumption that the forward and reverse routes are symmetric.

A conventional approach to determining if forward and reverse routes between points A and B are symmetric is to run a software program known as "traceroute" at both point A and point B. This program is also commonly referred to as the traceroute utility. The traceroute program run at point A characterizes the forward route from A to B, and the traceroute program run at point B characterizes the reverse route from B to A. The traceroute program traces the hops on a route from a source to a destination using the Time-To-Live (TTL) field of transmitted packets. In accordance with standard Internet protocol (IP) operation, each router receiving a packet will decrement the TTL field of that packet before forwarding it on to the next router. If a given router receives a packet with a TTL field having a value of one, and that router is not the destination of the packet, the given router discards the packet and sends an Internet Control Message Protocol (ICMP) port unreachable message back to the source. The traceroute program sends packets with monotonically increasing values in their respective TTL fields. For each TTL value, three packets are typically sent by default. This process continues until the packets sent with a given TTL value reach the destination and therefore do not trigger an ICMP port unreachable message. Asymmetric routes can be readily detected by comparing the outputs generated by the traceroute programs run at points A and B.

Unfortunately, this conventional approach has a serious drawback, in that it requires that the traceroute program be run at both points A and B. However, the network engineer attempting to detect route asymmetry between points A and B may have access to only one of the points, for example, due to device access restrictions within large network environments or within the Internet itself. If the engineer cannot run the traceroute program at both points, he or she cannot determine the asymmetry of the routes of interest.

Accordingly, a need exists for an improved approach to detecting asymmetric routes in a network, which can be implemented with access to only a single end point of the particular routes in question.

SUMMARY OF THE INVENTION

The present invention in one or more illustrative embodiments provides techniques for detecting asymmetric routes in a communication network.

In accordance with an aspect of the invention, route asymmetry is detected in a network by running a route tracing program to trace routes between a first element of the network and a second element of the network, and identifying forward and reverse routes between the first and second network elements as asymmetric if performance data from the route tracing program indicates a significant deviation from an expected monotonic characteristic as a function of TTL values of respective packets transmitted by the route tracing program. The route tracing program may comprise, for example, the above-noted conventional traceroute utility. The route tracing program need be run at only a single network element, such as the first network element.

In an illustrative embodiment, the performance data comprises round-trip delay data collected by the route tracing program, and the forward and reverse routes between the first and second network elements are identified as asymmetric if the performance data indicates a significant deviation from monotonically increasing delay as a function of time-to-live values of respective packets transmitted by the route tracing program.

A significant deviation from an expected monotonic characteristic may be identified using, for example, a predetermined deviation threshold, or multiple runs of the trace routing program. As a more particular example of the latter approach, the route tracing program may be run at least twice, with corresponding deviations from the expected monotonic characteristic being observed for each run before the forward and reverse routes are identified as asymmetric. Thus, if the deviation is not repeatable across multiple runs, it is not considered significant, but instead may be attributed to random fluctuations. It is also possible to use various statistical tests to determine if a particular deviation is significant.

Advantageously, the present invention in the illustrative embodiments provides an improved approach to detection of asymmetric routes in a network, which can be implemented from a single point in the network, thereby facilitating determination of the location of performance problems in the network.

DETAILED DESCRIPTION OF THE INVENTION

The invention will be illustrated below in conjunction with exemplary route detection processes, communication networks and associated network processing elements. It should be understood, however, that the invention is not limited to use with any of these particular illustrative arrangements. Those skilled in the art will recognize that the disclosed techniques may be used in any type of network application in which it is desirable to provide improved detection of route asymmetry.

Figure 1:
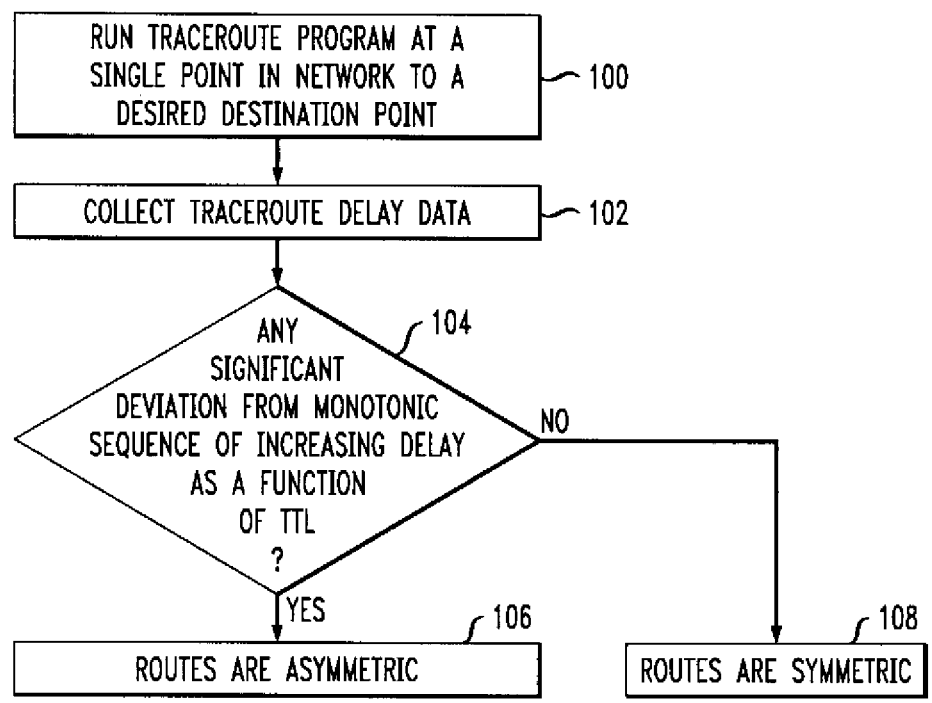
FIG. 1 is a flow diagram of an exemplary asymmetric route detection process in an illustrative embodiment of the invention.

Referring now to the flow diagram of FIG. 1, an asymmetric route detection process is shown. This process may be implemented in the form of one or more software programs that are executed by at least one processing element of a network. Such a processing element may comprise, for example, a network analysis device coupled to a router or other network element, or a portion of a router or other network element. Additional details regarding exemplary network element configurations will be described below in conjunction with FIGS. 3 and 4.

In step 100, a traceroute program, such as the conventional traceroute utility described previously herein, is run at a single point in a network to a desired destination point in the network. These points may be denoted as points A and B, and may comprise, for example, routers, switches, gateways or other types of network elements. The traceroute program traces routes between points A and B in the manner previously described, and produces performance data such as round-trip delay or loss in a conventional manner. The traceroute program may be viewed as an example of what is more generally referred to herein as a route tracing program. It is to be appreciated that a wide variety of route tracing programs other than the traceroute utility may be used in implementing the present invention. The term "route tracing program" as used herein is therefore intended to be construed broadly, so as encompass any type of program which characterizes network routes in terms of delay, loss or other types of performance data. For example, such a program need not explicitly identify each hop in a given route, but may instead just provide the associated performance data for further processing as described herein.

In step 102, delay data is collected from the traceroute program. As indicated above, other types of performance data, such as loss data, may be used in other embodiments. The collection step 102 may involve, for example, receiving, storing or otherwise processing one or more data outputs of the traceroute program. The data collection may occur at least in part in parallel with the running of the traceroute program in step 100. That is, data may be collected as it is generated by the traceroute program. As another example, the data may be collected only after the traceroute program has finished running.

In step 104, a determination is made as to whether the delay data from the traceroute program exhibits any significant deviation from an expected monotonic characteristic. More specifically, in the present embodiment dealing with delay data, this step determines if the delay data indicates a deviation from monotonically increasing delay as a function of the TTL values of respective packets transmitted by the traceroute program.

As indicated previously, a conventional traceroute program traces the hops on a route from a source to a destination using the TTL field of transmitted packets. Each router receiving a packet will decrement the TTL field of that packet before forwarding it on to the next router. If a given router receives a packet with a TTL field having a value of one, and that router is not the destination of the packet, the given router discards the packet and sends an ICMP port unreachable message back to the source. The traceroute program sends packets with monotonically increasing values in their respective TTL fields. For each TTL value, three packets are typically sent by default. This process continues until the packets sent with a given TTL value reach the destination and therefore do not trigger an ICMP port unreachable message. The traceroute program typically gathers performance data such as round-trip delay and loss data, as is well known.

The term "packet" as used herein is intended to encompass not only an IP packet but also other types of packets used in other packet-based communication networks. The techniques disclosed herein can be used with IP version 4 (IPv4) or IP version 6 (IPv6), or using other types of standard or non-standard communication protocols.

In the case of symmetric routes, it is expected that the delay and loss data will increase monotonically with increasing TTL values of the respective packets transmitted by the traceroute program. A deviation from such an expected monotonic characteristic may therefore be used to indicate the presence of asymmetric routes.

Thus, if step 104 determines that there is a significant deviation from an expected monotonic sequence of increasing delay as a function of TTL, the corresponding forward and reverse routes between the first and second network elements corresponding to respective points A and B may be identified as asymmetric, as indicated in step 106.

Similarly, if step 104 determines that there is no significant deviation from an expected monotonic sequence of increasing delay as a function of TTL, the corresponding forward and reverse routes between the first and second network elements corresponding to respective points A and B may be identified as symmetric, as indicated in step 108.

The performance data provided by the route tracing program may alternatively comprise loss data, as mentioned previously. In this case, the forward and reverse routes between the first and second network elements may be identified as asymmetric if the performance data indicates a significant deviation from monotonically increasing loss as a function of TTL values of respective packets transmitted by the traceroute program.

As indicated above, the route tracing program need not explicitly report or otherwise identify the actual hops of a given route. For example, assume that the sequence of efforts $E_1, E_2, \ldots$ in reaching respective points along a route are progressively more difficult and that the efforts can be measured. Also assume that the progression in difficulty is a result of the telescopic nature of the succession of efforts, in that the work to accomplish $E_i$ includes all of the work that was needed to accomplish $E_{(i-1)}$. The observation that $E_i < E_{(i-1)}$ is a challenge to the telescopic nature of the succession of efforts. In particular, the route tracing program used to measure the efforts may not report the route hops at all, but instead only the associated round-trip delay, loss or other performance data.

It should be noted that a "significant" deviation in step 104 of the FIG. 1 flow diagram may be identified in any of a number of different ways. For example, a threshold may be established in order to allow for some random deviation from the monotonic characteristic without triggering identification of asymmetric routes. In such an arrangement, step 104 does not identify a significant deviation unless the magnitude of the deviation exceeds the specified threshold. As another example, steps 100 and 102 may be repeated two or more times, with any corresponding observed deviations being deemed significant only if recurring in multiple instances of running the traceroute program. In this type of arrangement, the traceroute program is run at least twice and corresponding deviations from the expected monotonic characteristic must be observed for each of these runs before the forward and reverse routes are identified as asymmetric in step 104. Thus, a significant deviation may be, for example, one which exceeds a specified threshold, or one which persists over multiple runs of the traceroute program. The term "significant" in this context is generally intended to encompass deviations other than those attributable to random fluctuations.

Statistical tests may also or alternatively be used to identify if particular deviations from expected monotonic characteristics are significant. Thus, a significant deviation may be one which is determined to be statistically significant using a designated statistical test.

As one example of such an approach, significant deviations may be identified by running multiple pairwise comparisons for contiguous steps in the sequence. Let $y_{ij}$ denote the jth round-trip delay at TTL value i, where $1 \leq i \leq K$ and $1 \leq j \leq n$. Assume that $y_{ij}$ are independent measurements, with $y_{i1}, \ldots, y_{in}$ coming from a population with mean $\mu_1$, and that $\mu_1 \leq \mu_2 \leq \ldots \leq \mu_K$. This monotonic characteristic can be tested by testing the K−1 individual hypotheses $H_i$: $\mu_i \leq \mu_{i+1}$ for $1 \leq i \leq K-1$. To test $H_i$, one can use the measurements $y_{i1}, \ldots y_{in}$ and $y_{(i+1)1}, \ldots, y_{(i+1)n}$ in a standard test for a population mean such as the well-known Student's t-test: Let $\bar{y}_i$ and $\bar{y}_{i+1}$ be two sample means and let $s_i$ and $s_{i+1}$ be the corresponding two sample standard deviations. The hypothesis $H_i$ can be rejected if $t > t_{crit}$ where $$t = \frac{(\bar{y}_i - \bar{y}_{i+1})}{\sqrt{\frac{s_i^2}{n} + \frac{s_{i+1}^2}{n}}}$$

and where $t_{crit}$ is selected to achieve a desired level of significance. For example, with n=5, and for 2.5% significance, $t_{crit}$ is 2.3, with the $t_{crit}$ value taken from a Student's t-test table for 2(n−1)=8 degrees of freedom.

In order to control the overall statistical significance in multiple comparisons, one may determine the significance level of the individual test by dividing the overall level by the number of comparisons. Thus, in the case of the K−1 comparisons noted above, the individual comparisons may each be carried out at the significance level 5%/(K−1) in order to guarantee an overall 5% significance. With n=5 and K=5, $t_{crit}$ is 3.2, again from the Student's t-test table with 2(n−1)=8 degrees of freedom.

The degrees of freedom need not be computed as 2(n−1). For example, one may determine the degrees of freedom using the Welch-Satterthwaite approximation $$v = \frac{\left(\frac{s_i^2}{n} + \frac{s_{i+1}^2}{n}\right)^2}{\frac{s_i^4}{n^2(n-1)} + \frac{s_{i+1}^4}{n^2(n-1)}}$$

which reduces to 2(n−1) when $s_i = s_{i+1}$.

Those skilled in the art will recognize that a wide variety of other statistical tests may be used in place of the Student's t-test to perform the above-described comparisons. Also, the particular type of comparisons performed, or other aspects of the statistical testing, may be varied in other embodiments.

Advantageously, the illustrative embodiment of FIG. 1 can identify asymmetric routes by running a traceroute program on only a single network device. This overcomes the problems associated with the conventional approach, previously described herein, which requires that traceroute programs be run at two endpoints in order to detect route asymmetry.

It is to be appreciated that the particular arrangement of processing steps in FIG. 1 is presented by way of illustrative example only. Numerous alternative arrangements of processing steps may be used to detect route asymmetry using the techniques disclosed herein. For example, the determination of step 104 may itself be incorporated into a new route tracing program, such that the program automatically generates an indication of route asymmetry when it detects a corresponding significant deviation in the performance data that it generates. A given route tracing program is therefore not limited to any particular set of operations, but may encompass, for example, the operations associated with all of the steps of the FIG. 1 process.

Figure 2:
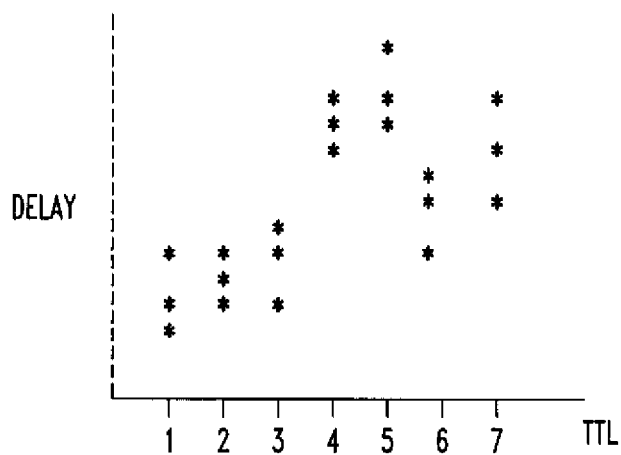
FIG. 2 shows exemplary traceroute output that may be generated as part of the process of FIG. 1.

FIG. 2 shows an example of performance data that may be collected from the traceroute program in the FIG. 1 process. In this example, the performance data comprises delay data that is plotted in the figure as a function of TTL values. Each of the data points in the plot corresponds to a measured round-trip delay at a corresponding TTL value. It can be seen that there are three data points for each TTL value, due to the above-noted default three packet per TTL value transmission of the conventional traceroute program. In other embodiments, more or fewer packets may be transmitted for each TTL value.

It is expected that, in the presence of symmetric forward and reverse routes between points A and B, the performance data will have a monotonic characteristic. In the present example, the delay values associated with the first packets transmitted for each TTL value would be expected to increase monotonically with TTL value. However, with reference to the plot of FIG. 2, it can be seen that there is a significant deviation from the expected monotonic characteristic at the TTL value of six, relative to the TTL values for the corresponding packets at TTLs of five and four. This significant deviation of the expected monotonically increasing delay characteristic is indicative of asymmetric routes between the points A and B.

Figure 3:
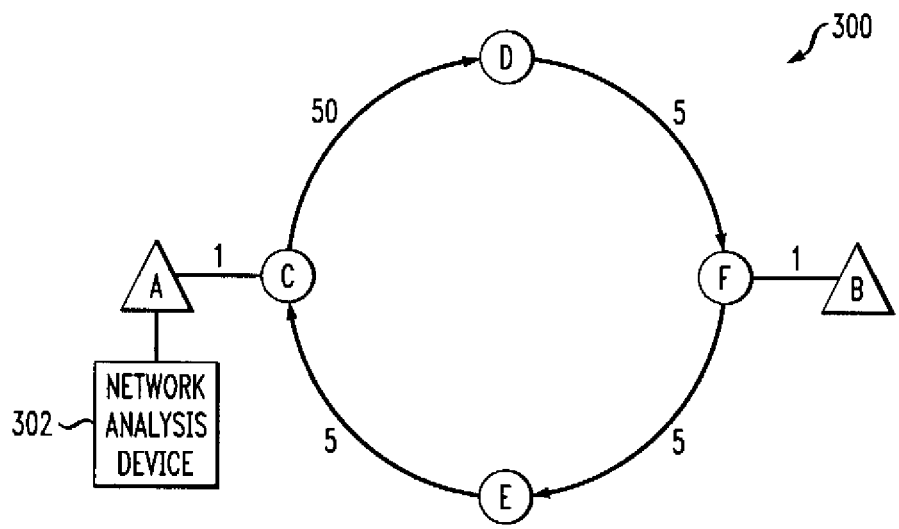
FIG. 3 shows a simple example of a network in which the process of FIG. 1 is implemented.

FIG. 3 shows a network 300 in which the above-described process for determining route asymmetry is implemented. The network as shown is simplified for clarity of illustration, and the disclosed techniques may be applied to networks of much greater complexity. The network includes first and second network elements A and B, which correspond to the respective points A and B previously described. The network elements A and B in this example are the respective source and destination of the packets transmitted as part of the traceroute program. The network elements A and B are interconnected by links with additional network elements C, D, E and F as shown. The network elements A, B, C, D, E and F may comprise routers, switches, gateways or other processing elements of the network 300, in any combination. Generally, such a processing element may comprise a processor, a memory and a network interface, as will be described in greater detail below in conjunction with FIG. 4.

The network 300 may represent, for example, a global communication network such as the Internet, a wide area network, a metropolitan area network, a local area network, a wireless cellular network, a public switched telephone network (PSTN), or a satellite network, as well as portions or combinations of these or other communication networks. As indicated above, the network 300 may comprise conventional routers, switches, gateways or other processing elements.

Also included in the network 300 is a network analysis device 302 which is illustratively shown as being coupled to the first network element A. This device controls the performance of the route asymmetry determination process. For example, it may initiate performance of one or more instances of the traceroute program from network element A, and analyze the resulting performance data in accordance with step 104 of the process in order to determine if forward and reverse routes between the first and second network elements A and B are asymmetric.

It should be noted that, although shown as a separate device in the exemplary network 300 of FIG. 3, the network analysis device 302 may alternatively be incorporated in whole or in part into the first network element A. Thus, a route asymmetry determination capability such as that associated with steps 100 through 108 in FIG. 1 may be incorporated into an otherwise conventional router, switch, gateway or other network element. Also, the traceroute program may run, for example, entirely on the first network element A, or partly on the network analysis device and partly on the network element A. Thus, the particular configuration shown in the figure is presented by way of illustrative example only.

The numbers shown above the respective links in the network 300 indicate the corresponding link delays for the present example. The traceroute program is used to route packets from source A towards destination B in the manner previously described. That is, three packets are transmitted for each TTL value, and the TTL values are monotonically increased. It can be seen from the figure that in the forward route element C routes to destination B via element D, while in the reverse route element F routes to source A via element E. The forward route routing by element C is inappropriate given the poor performance indicated by the relatively high delay number associated with the link from C to D. Given these forward and reverse routes, the delay data generated by running the traceroute program at source A to destination B in this example will be as follows for increasing TTL values:

| TTL Value | Element Reached | Round-Trip Delay |
|---|---|---|
| 1 | C | 2 (1 + 1) |
| 2 | D | 102 (1 + 50 + 50 + 1) |
| 3 | F | 67 (1 + 50 + 5 + 5 + 1) |
| 4 | B | 69 (1 + 50 + 5 + 1 + 1 + 5 + 5 + 1) |

This delay data exhibits a deviation from the expected monotonic characteristic in that the delay values are not monotonically increasing with TTL value. More specifically, the A-F round trip exhibits significantly improved delay performance compared to the A-D round trip, and this significant deviation from monotonically increasing delay is indicative of asymmetric forward and reverse routes.

It should be emphasized that the simplified configuration of the network 300 as shown in FIG. 3 is for purposes of illustration only, and should not be construed as limiting the invention to any particular arrangement of elements. For example, the network 300 may include additional elements, comprising other types and arrangements of routing elements, switching elements or other types of processing elements.

The route asymmetry detection process described above generally will not produce false positives. However, it may produce false negatives, in that asymmetric routes do not necessarily produce a significant deviation in the expected monotonic characteristic of the performance data. Thus, it is possible that some asymmetric routes may go undetected. In the above example, the process works because the C-D delay exceeds the sum of the F-E and E-C delays. Generally, the process in the illustrative embodiment above will detect asymmetric routes when such routes result in substantially worse performance than the correct symmetric routes. In other words, the process will detect asymmetric routes when the forward and reverse routes exhibit substantially different performances.

This detection condition may be viewed as corresponding to a violation of a so-called triangle inequality. Thus, asymmetric routes will produce a significant deviation from the expected monotonic characteristic provided that the asymmetric routes form a triangle over which the triangle inequality is violated, that is, the performance when traversing two of the sides of the triangle is better than the performance when traversing the third. With reference to the FIG. 3 example, the C-D and D-F links may collectively be considered one side of such a triangle, with the F-E and E-C links being the other two sides of the triangle.

It should be noted that conditions on a network do evolve over time and that the route asymmetry detection process described above could reveal asymmetric routes only under load conditions. Referring again to the FIG. 3 example, the high delay associated with the C-D link could be a transient phenomenon. Also, certain network delays, even at the same load conditions, may have an associated "long tailed" distribution. The performance data generated by the traceroute program at any instance in time may be viewed as a sample from this distribution. Thus, the determination of the existence of asymmetric routes may be probabilistic in such situations. This type of variation in performance data can be accounted for by utilizing an appropriate threshold or multiple runs of the traceroute program before indicating a significant deviation, as was previously described in conjunction with step 104 of FIG. 1.

Another advantage of the route asymmetry detection process described above is that it can also identify the portion of the route that is causing a performance problem. For example, with reference to the plot of FIG. 2, where the delay data deviates from a monotonically increasing sequence at a TTL value of six, it is expected that the network element causing the problem is one of the elements on the route before the element corresponding to that TTL value is reached. As another example, with reference to the network 300 and its associated delay data as shown in FIG. 3, the deviation from the monotonically increasing sequence occurs for a TTL value of three, where element F is reached. This indicates that the performance problem leading to the asymmetric routes is on the corresponding forward route at some point prior to element F, in this case in the link between C and D.

The techniques of the present invention can thus be used to facilitate identification of performance problem locations in a network. Such techniques may be implemented in or otherwise used in conjunction with known approaches to determining performance problem locations in a network. See, for example, U.S. Patent Application Publication No. 2005/0053009, entitled "Method and Apparatus for Automatic Determination of Performance Problem Locations in a Network," which is commonly assigned herewith. This application discloses techniques for automatically determining the particular locations associated with performance problems in a network comprising a plurality of endpoint devices.

Accordingly, a given embodiment of the invention may be in the form of a method, apparatus or system for locating a performance problem in a network, with the location being determined based on detection of asymmetric network routes as described herein. Other embodiments of the present invention may involve, for example, altering the operation of a network based on the detection of asymmetric routes, generating a report, alert or other indicator of asymmetric routes and emailing or otherwise providing that indicator to a network administrator, or taking other real-time or non-real-time actions based on detection of asymmetric routes or associated performance problem locations.

Figure 4:
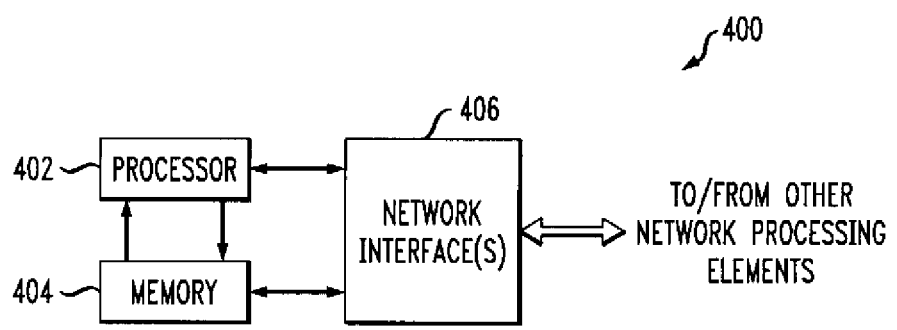
FIG. 4 is a block diagram showing one possible implementation of a given network analysis device, router or other processing element of the FIG. 3 network.

FIG. 4 shows an example of a given processing element 400 of the network 300. This processing element may be viewed as representing at least a portion of network analysis device 302, network element A, or a combination of these elements.

The processing element 400 as shown in the figure includes a processor 402 coupled to a memory 404 and one or more network interfaces 406. The techniques of the present invention may be implemented at least in part in the form of software storable in the memory 404 and executable by the processor 402. The memory 404 may represent random access memory (RAM), read-only memory (ROM), optical or magnetic disk-based storage, or other storage elements, as well as combinations thereof.

Those skilled in the art will recognize that the individual elements of FIG. 4 as shown for illustrative purposes may be combined into or distributed across one or more processing devices, e.g., a microprocessor, an application-specific integrated circuit (ASIC), a computer or other device(s).

The FIG. 4 arrangement is considerably simplified for purposes of illustration. For example, if viewed as representative of a router, switch or other network element, the processing element 400 may include conventional elements typically associated with such a device, for example, elements associated with providing router functionality or switch functionality. Similarly, if viewed as representative of network analysis device 302, the processing element 400 may comprise input devices such as a mouse or keyboard, as well as output devices such as a display monitor, storage device or printer.

As previously noted, one or more of the operations associated with a route asymmetry detection process as described above in conjunction with the illustrative embodiments may be implemented in whole or in part in software utilizing processor 402 and memory 404 associated with a network processing element. Other suitable arrangements of hardware, firmware or software may be used to implement the techniques of the invention.

It should again be emphasized that the above-described arrangements are illustrative only. For example, alternative embodiments may involve different types of trace routing programs and associated performance data, different techniques for identifying significant deviation from a monotonic characteristic within such data, and so on. Also, the particular processing steps associated with the route asymmetry detection in the illustrative embodiments may be varied. Furthermore, the particular assumptions used in the context of describing the illustrative embodiments should not be viewed as requirements of the invention, and embodiments may be constructed in which one or more of these assumptions do not apply. These and numerous other alternative embodiments within the scope of the following claims will be apparent to those skilled in the art.

What is claimed is:

1. A method comprising:
executing a route tracing program, at a first network element, the route tracing program transmitting a sequence of packets with different time-to-live values along a forward route that spans from the first network element to a second network element, wherein the route tracing program specifies the second network element as the destination of the sequence of packets, wherein a reverse route spans from the second network element to the first network element, and wherein the sequence of packets are configured to trigger control messages to be transmitted to the first network element;

in response to executing the route tracing program, calculating performance measurements based on the control messages corresponding to the different time-to-live values, and wherein a first portion of the control messages has been transmitted to the first network element via the forward route and a second portion of the control messages has been transmitted to the first network element via the reverse route;

determining an expected monotonic characteristic that is exhibited by the performance measurements in relation to the different time-to-live values; and identifying the forward route and the reverse route as being asymmetric with each other when a performance measurement that corresponds to an individual time-to-live value indicates a deviation, over a predetermined deviation threshold, from the expected monotonic characteristic.

2. The method of claim 1, wherein the route tracing program comprises a traceroute utility.

3. The method of claim 1, further comprising identifying the forward route and the reverse route as being asymmetric with each other when the performance measurement that corresponds to the individual time-to-live value exceeds a threshold of the expected monotonic characteristic, wherein the expected monotonic characteristic is exhibited by the performance measurements in relation to the different time-to-live values.

4. The method of claim 1, wherein the route tracing program is executed at least in part on the first network element.

5. The method of claim 1, wherein the route tracing program runs on a network analysis device coupled to the first network element.

6. The method of claim 1, wherein at least one of the first network element and the second network element comprises at least one of a router and a switch.

7. The method of claim 1, wherein the performance measurements comprise delay data.

8. The method of claim 1, further comprising identifying the forward route and the reverse route as being symmetric with each other when the performance measurements indicate no deviation, over the predetermined deviation threshold, from the expected monotonic characteristic.

9. The method of claim 1, wherein the route tracing program is executed at least twice, wherein deviations in the performance measurements in a first execution of the route tracing program and, deviations in the performance measurements in a second execution of the route tracing program, are observed for each execution before the forward route and the reverse route are identified as being asymmetric.

10. The method of claim 1, further comprising utilizing the forward route and the reverse route to determine a location of a performance problem in a network when the forward route and the reverse route are identified as being asymmetric with each other.

11. The method of claim 1, further comprising transmitting to a network administrator, an indicator of the forward route and the reverse route when the forward route and the reverse route are identified as being asymmetric with each other.

12. The method of claim 1, further comprising utilizing the forward route and the reverse route to alter operations of a network when the forward route and the reverse route are identified as being asymmetric with each other.

13. A non-transitory computer-readable storage medium storing instructions which, when executed by a processor, implements the method of claim 1.

14. A processing element comprising a processor and a memory, the memory being coupled to the processor, the processing element being configured to implement the method of claim 1.

15. A system comprising:
a processor; and
a non-transitory computer-readable storage medium storing instructions which, when executed by the processor, cause the processor to perform operations comprising:
executing a route tracing program, at a first network element, the route tracing program transmitting a sequence of packets with different time-to-live values along a forward route that spans from a first network element to a second network element, wherein the route tracing program specifies the second network element as the destination of the sequence of packets, wherein a reverse route spans from the second network element to the first network element, and wherein the sequence of packets are configured to trigger control messages to be transmitted to the first network element;
in response to executing the route tracing program, calculating performance measurements based on the control messages corresponding to the different time-to-live values, and wherein a first portion of the control messages has been transmitted to the first network element via the forward route and a second portion of the control messages has been transmitted to the first network element via the reverse route;
determining an expected monotonic characteristic that is exhibited by the performance measurements in relation to the different time-to-live values; and
identifying the forward route and the reverse route as being asymmetric with each other when a performance measurement that corresponds to an individual time-to-live value indicates a deviation, over a predetermined deviation threshold, from the expected monotonic characteristic.

16. The system apparatus of claim 15, wherein the system is implemented within a network analysis device coupled to the first network element.

17. The system of claim 15, wherein the system is implemented at least in part within the first network element.

18. The system of claim 15, wherein the first network element comprises one of a router and a switch.

19. A network comprising:
a plurality of interconnected network elements, including a first network element and a second network element interconnected by multiple routes;
wherein a route tracing program is executed at the first network element, the route tracing program transmitting a sequence of packets with different time-to-live values along a forward route that spans from the first network element to the second network element, wherein the route tracing program specifies the second network element as the destination of the sequence of packets, wherein a reverse route spans from the second network element to the first network element, and wherein the sequence of packets are configured to trigger control messages to be transmitted to the first network element;
wherein, in response to executing the route tracing program, the route tracing program calculates performance measurements based on the control messages corresponding to the different time-to-live values, and wherein a first portion of the control messages has been transmitted to the first network element via the forward route and a second portion of the control messages has been transmitted to the first network element via the reverse route;
wherein the route tracing program determines an expected monotonic characteristic that is exhibited by the performance measurements in relation to the different time-to-live values; and
wherein the route tracing program identifies the forward route and the reverse route as being asymmetric with each other when a performance measurement that corresponds to an individual time-to-live value indicates a deviation, over a predetermined deviation threshold, from the expected monotonic characteristic.

20. The network of claim 19, wherein the route tracing program is run on a network analysis device coupled to the first network element.

21. The network of claim 19, wherein the route tracing program is executed at least in part on the first network element.

* * * * *